UNITED STATES PATENT OFFICE.

CARLETON ELLIS, OF MONTCLAIR, NEW JERSEY, ASSIGNOR TO CHADELOID CHEMICAL COMPANY, OF NEW YORK, N. Y., A CORPORATION OF WEST VIRGINIA.

COMPOSITION OF MATTER ADAPTED FOR USE AS DISINFECTING SOLUTIONS, &c.

1,302,905.      Specification of Letters Patent.      Patented May 6, 1919.

No Drawing. Application filed November 2, 1917, Serial No. 199,894. Renewed March 21, 1919. Serial No. 284,175.

*To all whom it may concern:*

Be it known that I, CARLETON ELLIS, a citizen of the United States, and a resident of Montclair, in the county of Essex and State of New Jersey, have invented certain new and useful Improvements in Composition of Matter Adapted for Use as Disinfecting Solutions, &c., of which the following is a specification.

This invention relates to a disinfectant and insecticidal composition or solution and in one phase relates particularly to a mixture of chlorinated hydrocarbons. For the base solvent or vehicle I prefer to use chlorinated aromatic hydrocarbons such as chlorbenzol, chlortoluol, chlorxylol and chlorinated solvent naphtha. Ordinary monochlorbenzol is well suited for the purpose and it is used herein as an illustrative vehicle.

A certain quantity of carbolic acid or phenol, or the homologues thereof, such as cresylic acid is, in some cases, incorporated with the chlorinated hydrocarbons. Preferably a much smaller amount of the carbolic acid is used than chlorbenzol, usually only one-fourth to one-sixth as much.

In this composition, I also preferably use a small amount of a light volatile chlorinated hydrocarbon of the aliphatic series, carbon tetrachlorid being suitable for the purpose, but other chlorinated compounds such as chlorinated acetylene, dichlorethylene, trichlorethylene and the corresponding chlor compounds of ethane, including the higher chlorinated compounds thereof may be employed. Carbon tetrachlorid has a tendency to make the composition acid in the presence of moisture and when it is used the solution should be made as nearly anhydrous as possible in case the composition is to be put up in tin cans.

Other bodies which have a disinfecting or insecticidal action are the dichlor and trichlorbenzols and similar chlorinated derivatives. Of the other aromatic hydrocarbons, paradichlorbenzol is excellent for the purpose and may be added as desired, or, say to the extent of five or ten per cent. Other bodies which may be added are pine oil, Russian turpentine, wood tar oil and the like.

The composition has the advantage over many of the preparations now on the market of being substantially free from readily inflammable components. While gasolene is often used as a vehicle for various insecticidal bodies it is highly inflammable. The same criticism applies to carbonbisulfid, the vapors of which are extremely inflammable. In the present case by using chlorbenzol or similar chlorinated body as the basis and especially by adding small amounts of carbon tetrachlorid or similar chlorinated body, a substantially non-inflammable product may be obtained, one for example, which cannot be ignited readily by bringing a lighted match in contact with the solution.

While I may proportion the chlorinated aromatic hydrocarbons and the chlorinated aliphatic hydrocarbons in various ways, I prefer a ratio in the specific case employed herein of chlorbenzol about 7 parts and carbon tetrachlorid 1 part by volume. This gives a vehicle of excellent non-flashing qualities having good solvent power so that it will take up quantities of dichlorbenzol, carbolic acid and the like as may be required in preparing the disinfectant composition.

Another formula containing carbolic acid is prepared from monochlorbenzol 70 parts by volume, carbon tetrachlorid 10 parts by volume and carbolic acid crystals approximately 15 parts by volume (measuring the carbolic acid in a molten state.) These proportions may be increased or decreased according to circumstances, each component being varied more or less. Preferably, however, the chlorbenzol or aromatic chlorinated compound is largely in excess of the carbon tetrachlorid and also of the carbolic acid when the latter is used.

Ordinary chlorbenzol is fairly difficult to ignite when it is well purified and free from benzol and toluol. For example, when a lighted match is brought in contact with a thin layer, it does not inflame quickly but only after the surface has become heated to a considerable extent does flashing and burning take place. Since this degree of inflammability is objectionable for some purposes, a relatively small amount of carbon tetrachlorid may be added to produce a vehicle which does not flash or burn in this manner and I have observed that approximately one part of the tetrachlorid to seven parts by volume of the chlorbenzol makes an excellent proportion. As stated, carbolic acid or phenol may be added if desired to this composition, preferably, however, employing at least five or ten per cent. and upward to twenty-five per cent. or more of the phenol in the composition.

As stated, other bodies such as pine oil, say to the extent of five per cent., or more, Russian turpentine in like amount, highly purified wood tar oil, especially that having a high boiling point and heavy oil of acetone obtained in the manufacture of ordinary acetone may be used in small amount.

It is also possible to add other material such as a small amount of laundry soap which may be dried for the purpose and dissolved in the vehicle by heating. In this manner an anhydrous composition is obtained, if desired, in which carbon tetrachlorid may be used without danger of free acid being developed. Of course, it is possible to use compositions containing water such as ordinary sodium oleate in concentrated form but preferably I employ an anhydrous or substantially anhydrous composition. A composition containing moisture has one advantage, namely, that when the disinfecting solution is added to water, an emulsion is readily obtained by means of which the composition may be readily distributed over large surface or sprayed in suitable atomizing apparatus and the like.

What I claim is:—

1. A composition of matter which may be used as a disinfecting composition, which comprises carbolic acid incorporated in a vehicle containing a major proportion of a chlorinated liquid hydrocarbon of the benzol series and a minor proportion of carbon tetrachlorid.

2. A composition of matter which may be used as a disinfecting composition which comprises a phenol dissolved in a vehicle consisting largely of chlorbenzol and a substantially lesser proportion of light volatile chlorinated compound of the aliphatic series.

3. A composition comprising approximately monochlor benzol 70 parts by volume, carbon tetrachlorid 10 parts and phenol 15 parts.

CARLETON ELLIS.